(12) United States Patent
Miyamoto

(10) Patent No.: US 10,434,402 B2
(45) Date of Patent: Oct. 8, 2019

(54) INFORMATION PROCESSING APPARATUS, COMPUTER-READABLE NON-TRANSITORY STORAGE MEDIUM HAVING STORED THEREIN INFORMATION PROCESSING PROGRAM, INFORMATION PROCESSING METHOD, AND INFORMATION PROCESSING SYSTEM

(71) Applicant: NINTENDO CO., LTD., Kyoto (JP)

(72) Inventor: Shigeru Miyamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 588 days.

(21) Appl. No.: 14/843,427

(22) Filed: Sep. 2, 2015

(65) Prior Publication Data

US 2016/0107080 A1 Apr. 21, 2016

(30) Foreign Application Priority Data

Oct. 15, 2014 (JP) .................................. 2014-211005

(51) Int. Cl.
*A63F 13/5255* (2014.01)
*A63F 13/211* (2014.01)
(Continued)

(52) U.S. Cl.
CPC .......... *A63F 13/211* (2014.09); *A63F 13/213* (2014.09); *A63F 13/26* (2014.09); *A63F 13/5255* (2014.09); *A63F 13/837* (2014.09)

(58) Field of Classification Search
CPC .. A63F 13/00; A63F 2300/10; A63F 2300/63; A63F 2300/646; A63F 2300/661;
(Continued)

(56) References Cited

U.S. PATENT DOCUMENTS 6,097,441 A * 8/2000 Allport ............ H04N 21/43632
348/120
9,004,997 B1 * 4/2015 Prosin ................... A63F 13/837
463/2

(Continued)

FOREIGN PATENT DOCUMENTS

EP 2485119 A2 8/2012
JP 2006-280447 A 10/2006
(Continued)

*Primary Examiner* — David L Lewis
*Assistant Examiner* — Ross A Williams
(74) *Attorney, Agent, or Firm* — Nixon & Vanderhye P.C.

(57) ABSTRACT

An input from an input device including a first input section and a second input section is received. A direction of movement of a player object is set based on the input from the first input section, and a direction relating to an action of the player object other than the movement is set based on the input from the second input section. Further, an image taken by a first virtual camera is displayed on a first display area, based on the direction of movement of the player object, and an image taken by a second virtual camera is displayed on a second display area, based on the direction relating to the action of the player object other than the movement. The first virtual camera and the second virtual camera are present in the same virtual space, and take images from different positions and/or different directions in the virtual space.

31 Claims, 14 Drawing Sheets

(51) Int. Cl.
    *A63F 13/213*     (2014.01)
    *A63F 13/837*     (2014.01)
    *A63F 13/26*     (2014.01)

(58) Field of Classification Search
    CPC .......... A63F 2300/6684; A63F 13/5252; A63F 13/5255
    USPC .............................................. 463/2, 5, 7, 36
    See application file for complete search history.

(56) References Cited

U.S. PATENT DOCUMENTS

| | | | |
|---|---|---|---|
| 2008/0143722 A1* | 6/2008 | Pagan | ..................... A63F 13/10 345/427 |
| 2012/0007882 A1 | 1/2012 | Sakurai et al. | |
| 2012/0146992 A1 | 6/2012 | Maeta et al. | |
| 2014/0135117 A1 | 5/2014 | Abe et al. | |
| 2014/0274239 A1 | 9/2014 | Han | |

FOREIGN PATENT DOCUMENTS

| | | |
|---|---|---|
| JP | 2011-258151 | 12/2011 |
| JP | 2012-128514 | 7/2012 |
| JP | 2012-161604 | 8/2012 |
| JP | 2014-097219 A | 5/2014 |
| JP | 2014-171860 A | 9/2014 |

* cited by examiner

FIG. 12
FIG. 13
FIG. 14
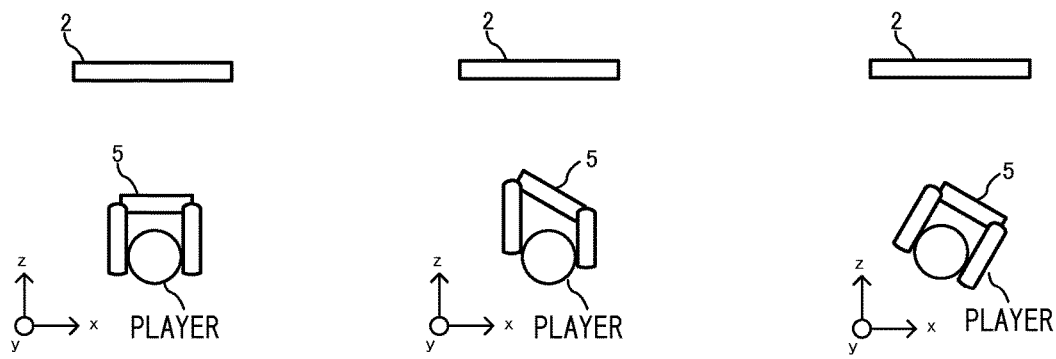
FIG. 15
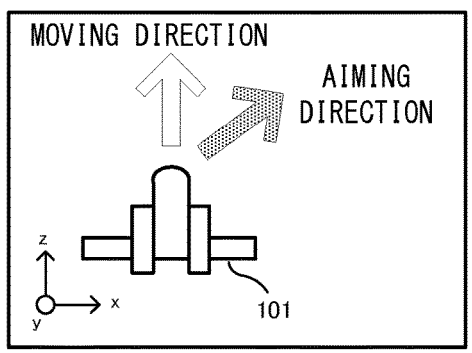
FIG. 16
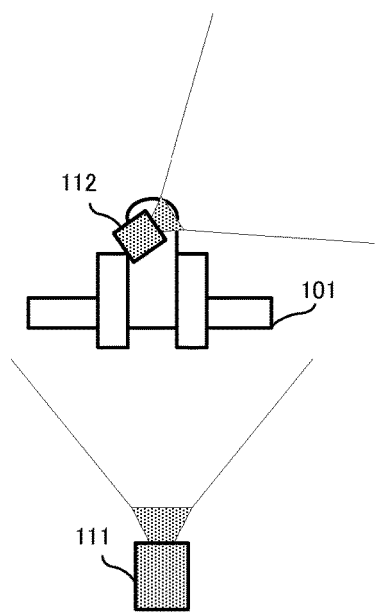

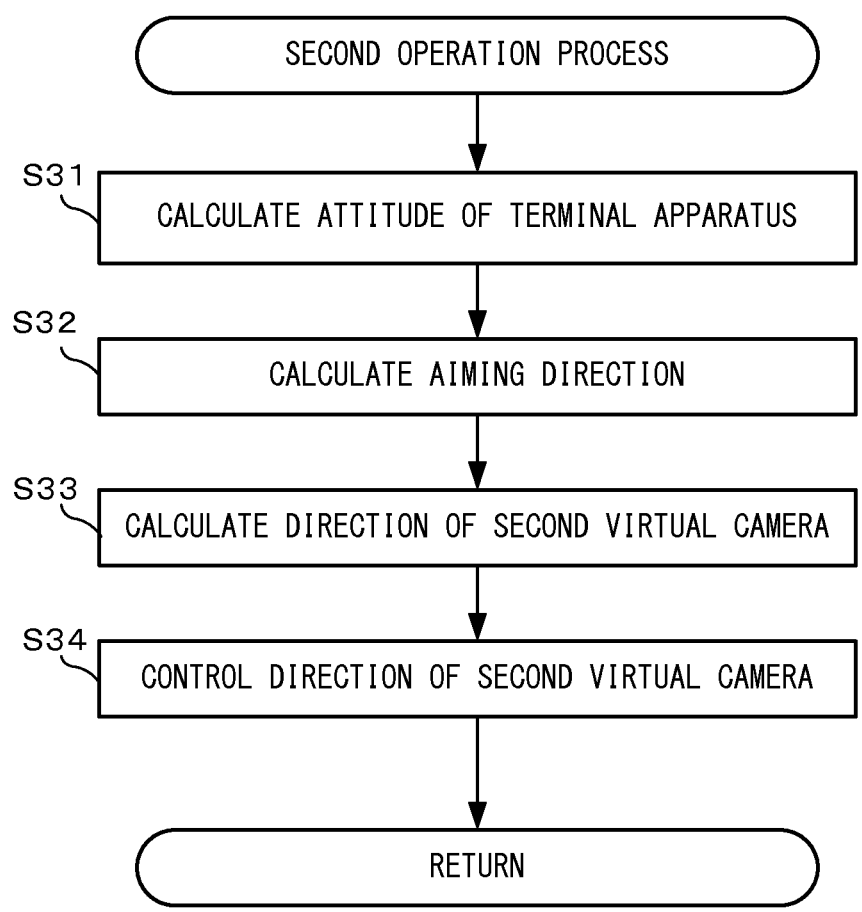
F I G. 28

INFORMATION PROCESSING APPARATUS, COMPUTER-READABLE NON-TRANSITORY STORAGE MEDIUM HAVING STORED THEREIN INFORMATION PROCESSING PROGRAM, INFORMATION PROCESSING METHOD, AND INFORMATION PROCESSING SYSTEM

CROSS REFERENCE TO RELATED APPLICATION

The disclosure of Japanese Patent Application No. 2014-211005, filed on Oct. 15, 2014, is incorporated herein by reference.

FIELD

The exemplary embodiments relate to an information processing apparatus using an input device including a first input section and a second input section different from the first input section, and more particularly, to information processing for operating, with the input device, a player object present in a virtual space.

BACKGROUND AND SUMMARY

There is a conventional game apparatus which executes a shooting game based on a third-person viewpoint. In such a game, when a player performs an operation to change a moving direction of a player object, a shooting direction (aiming direction) is also changed with the change in the moving direction. That is, the moving direction and the shooting direction (aiming direction) are changed in conjunction with each other.

In the above-mentioned game apparatus, even when the player desires to change only the shooting direction, the moving direction of the player object is also changed with the operation to change the shooting direction, which makes the operation for the moving direction of the player object difficult.

Therefore, it is a feature of the exemplary embodiments to provide an information processing apparatus and the like which enhance operability of a direction instructing operation for movement of an object present in a virtual space, and operability of a direction instructing operation for an action of the object other than the movement.

The feature described above is attained by, for example, the following configuration.

A configuration example is an information processing apparatus that controls a player object present in a virtual space by using an input device including a first input section and a second input section different from the first input section. The information processing apparatus includes an input reception section, a direction setting section, and a display control section. The input reception section receives inputs from the first input section and the second input section. The direction setting section sets a direction of movement of the player object, based on the input from the first input section, and sets a direction relating to an action of the player object other than the movement, based on the input from the second input section. The display control section displays, on a first display area, an image taken by a first virtual camera based on the direction of movement of the player object, and displays, on a second display area, an image taken by a second virtual camera based on the direction relating to the action of the player object other than the movement. The first virtual camera and the second virtual camera are present in the same virtual space, and take images from different positions and/or different directions in the virtual space.

According to the above configuration example, it is possible to enhance operability of an operation to instruct a moving direction of the player object, and operability of an operation to instruct a direction of an action of the player object other than the movement.

As another configuration example, the direction setting section may set, based on the input from the first input section, both the direction of movement of the player object and the direction relating to an action of the player object other than the movement, and may set, based on the input from the second input section, a direction relating to an action of the player object other than the above-mentioned action.

According to the above configuration example, when performing an operation regarding the moving direction of the player object and, for example, an operation regarding the shooting direction, the operation regarding the shooting direction can be performed independently from the operation regarding the moving direction, thereby further enhancing the operability.

As another configuration example, the direction relating to the action of the player object other than the movement may be a direction in which the player object performs an attack in predetermined game processing. Alternatively, the direction relating to the action of the player object other than the movement may be a direction of a shooting aim used for a shooting process in the predetermined game processing.

According to the above configuration example, the operability of the player object in the predetermined game processing can be further enhanced.

As another configuration example, the first display area may be included in a first display device, and the second display area may be included in a second display device different from the first display device.

According to the configuration example, the image taken by the first virtual camera and the image taken by the second virtual camera can be displayed on the different display devices, thereby enhancing the entertaining feature of the game.

As another configuration example, the second display area may be a display section included in the same housing as the input device. The second input section may be a motion sensor that detects a motion of the input device itself. The motion sensor may be an angular velocity sensor. Further, the first input section may be an input section using no motion sensor. The input section using no motion sensor may be an input unit capable of outputting an input amount from a reference position to a predetermined direction.

According to the above configuration example, an input from the second input section can be performed by moving the input device itself, thereby allowing the player to perform an intuitive operation. Further, when the first input section is not a motion sensor while the second input section is a motion sensor, the operability can be further enhanced.

As another configuration example, the display control section may take, with the first virtual camera, an image to be displayed on the first display area so that the image becomes an image based on a third-person viewpoint, and may take, with the second virtual camera, an image to be displayed on the second display area so that the image becomes an image based on a first-person viewpoint. Further, the display control section, in the image taking with the first virtual camera, may take the image so that the player object is always included in an image taking range.

According to the above configuration example, the player is allowed to recognize, by viewing the image based on the third-person viewpoint, the surroundings of the player object which are difficult to be recognized from the first-person viewpoint, thereby enhancing the entertaining feature of the game in the game processing or the like.

As another configuration example, the direction setting section, based on the input from the second input section, may set a direction of movement of a predetermined object relating to the action of the player object other than the movement of the player object. Alternatively, the input reception section may include a position designating section that designates a predetermined position in a virtual space, based on the input from the second input section. In this case, the direction setting section, based on the designated position, may set the direction relating to the action of the player object other than the movement.

According to the configuration example, when performing an operation regarding the moving direction of the player object and an operation regarding an action other than the movement, for example, a shooting direction, the operation regarding the shooting direction can be performed independently from the operation regarding the moving direction, thereby further enhancing the operability.

As another configuration example, the information processing apparatus may further includes a movement operation switching section configured to switch an operation to control movement of the player object based on the input from the first input section, to an automatic operation to automatically control movement of the player object. While the automatic operation is being executed, the direction setting section may display, on the first display area, an image taken with the first virtual camera based on the direction of movement of the player object controlled by the automatic operation.

According to the above configuration example, the difficulty of a game in predetermined game processing can be reduced, thereby providing the player with a game easily playable to the player.

Another configuration example is an information processing apparatus that controls a player object present in a virtual space by using an input device including an angular velocity sensor and an input unit capable of outputting an input amount from a reference position to a predetermined direction. The information processing apparatus includes an input reception section and a direction setting section. The input reception section receives inputs from the angular velocity sensor and the input unit. The direction setting section sets a direction of movement of the player object, based on the input from the input unit, and sets a direction relating to an action of the player object other than the movement, based on the angular velocity sensor.

According to the above configuration example, it is possible to enhance operability of an operation to instruct a moving direction of the player object, and operability of an operation to instruct a direction of an action of the player object other than the movement.

According to the present embodiment, it is possible to enhance operability of an operation to instruct a moving direction of the player object, and operability of an operation to instruct a direction of an action of the player object other than the movement.

BRIEF DESCRIPTION OF THE DRAWINGS

FIG. 12 is a diagram illustrating a second operation;

FIG. 13 is a diagram illustrating the second operation;

FIG. 14 is a diagram illustrating the second operation;

FIG. 15 is a diagram illustrating the second operation;

FIG. 16 is a diagram illustrating the second operation;

FIG. 28 is a flowchart illustrating, in detail, a second operation process in step S6 shown in FIG. 26.

DETAILED DESCRIPTION OF NON-LIMITING EXAMPLE EMBODIMENTS

Hereinafter, an exemplary embodiment will be described.

[1. Overall Structure of Game System]

Figure 1:
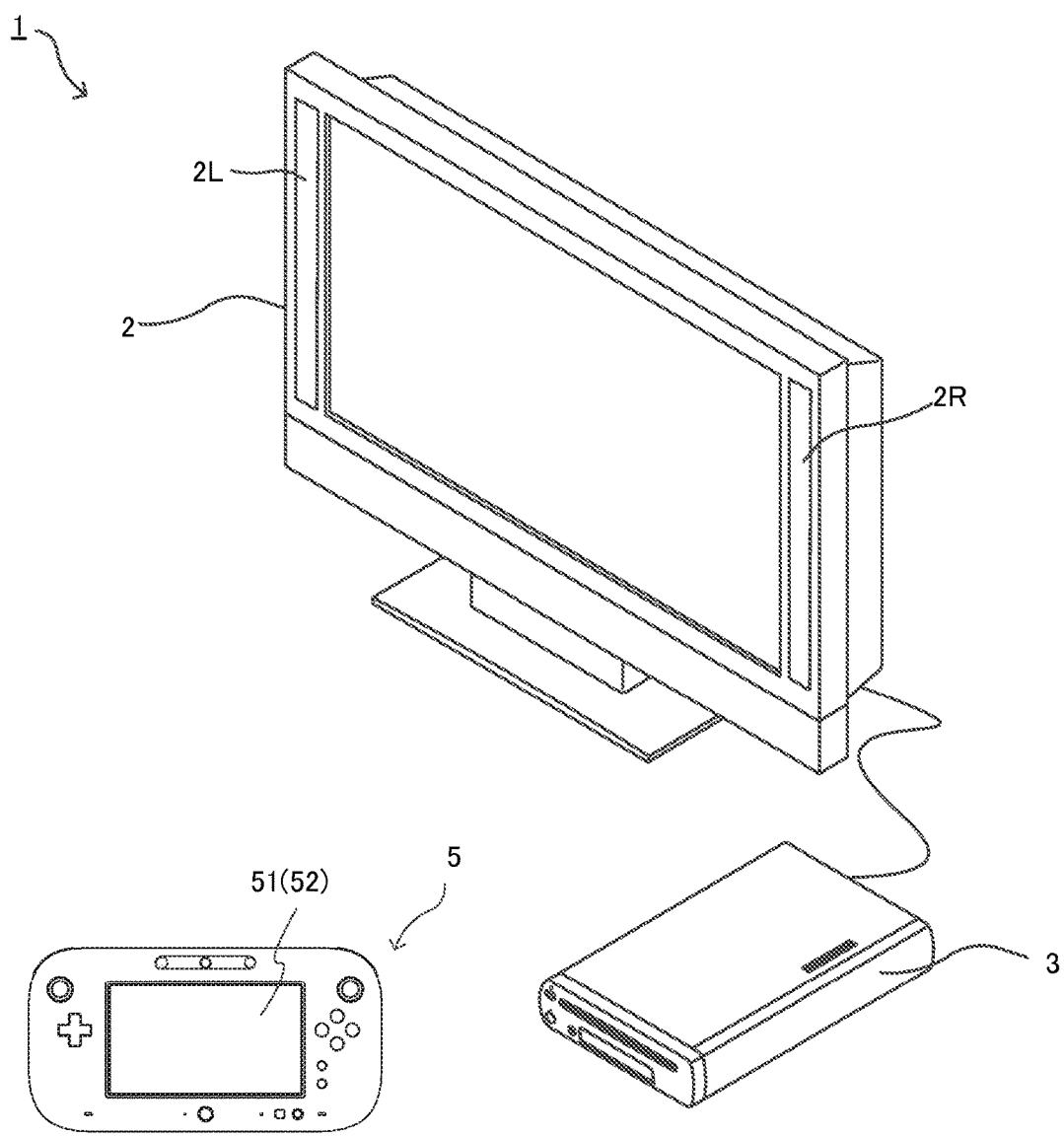
FIG. 1 is an external view of a game system 1 according to an exemplary embodiment.

Hereinafter, a game system 1 as an example of an information processing system according to the present embodiment will be described with reference to the drawings. FIG. 1 is an external view of the game system 1. In FIG. 1, the game system 1 includes a stationary display device (hereinafter, referred to as a "television") 2 typified by a television receiver or the like, a stationary game apparatus 3, and a terminal apparatus 5. The game system 1 executes game processing in the game apparatus 3, based on a game operation using the terminal apparatus 5, and displays a game image obtained by the game processing, on the television 2 and/or the terminal apparatus 5.

An optical disc (not shown), which is an exemplary information storage medium changeable with respect to the game apparatus 3, is detachably loaded into the game apparatus 3. An information processing program (typically, a game program) that is executed in the game apparatus 3 is stored on the optical disc. On a front surface of the game apparatus 3, a slot through which the optical disc is inserted is provided. The game apparatus 3 executes game processing by reading and executing the information processing program stored on the optical disc which has been inserted through the slot. The information storage medium is not limited to the optical disc as described above, and may be magnetic media such as a flash memory, a ROM, and a RAM.

The television 2 is connected to the game apparatus 3 via a connection cord. The television 2 displays a game image obtained by game processing executed in the game apparatus 3. The television 2 includes loudspeakers 2L and 2R. The loudspeakers 2L and 2R each output game sound obtained as a result of the game processing. In another embodiment, the game apparatus 3 and the stationary display device may be integrated together. Further, communication between the game apparatus 3 and the television 2 may be wireless communication.

The terminal apparatus 5 is small enough to be held by a user. The user is allowed to move the terminal apparatus 5 with hands or place the terminal apparatus 5 at any location when using the terminal apparatus 5. Although the detailed configuration of the terminal apparatus 5 will be described later, the terminal apparatus 5 includes an LCD (Liquid Crystal Display) 51 as display means, and input means (a touch panel 52, a motion sensor 82, and the like described later). The terminal apparatus 5 and the game apparatus 3 are able to communicate with each other wirelessly (or via wired means). The terminal apparatus 5 receives, from the game apparatus 3, data of an image (e.g., a game image) generated by the game apparatus 3, and displays the image on the LCD 51. In the present embodiment, an LCD is employed as a display device, but the terminal apparatus 5 may have any other display device such as a display device using EL (electroluminescence), for example. Further, the terminal apparatus 5 transmits, to the game apparatus 3, operation data representing the content of the operation performed on the terminal apparatus 5 itself.

[2. Internal Configuration of Game Apparatus 3]

Figure 2:
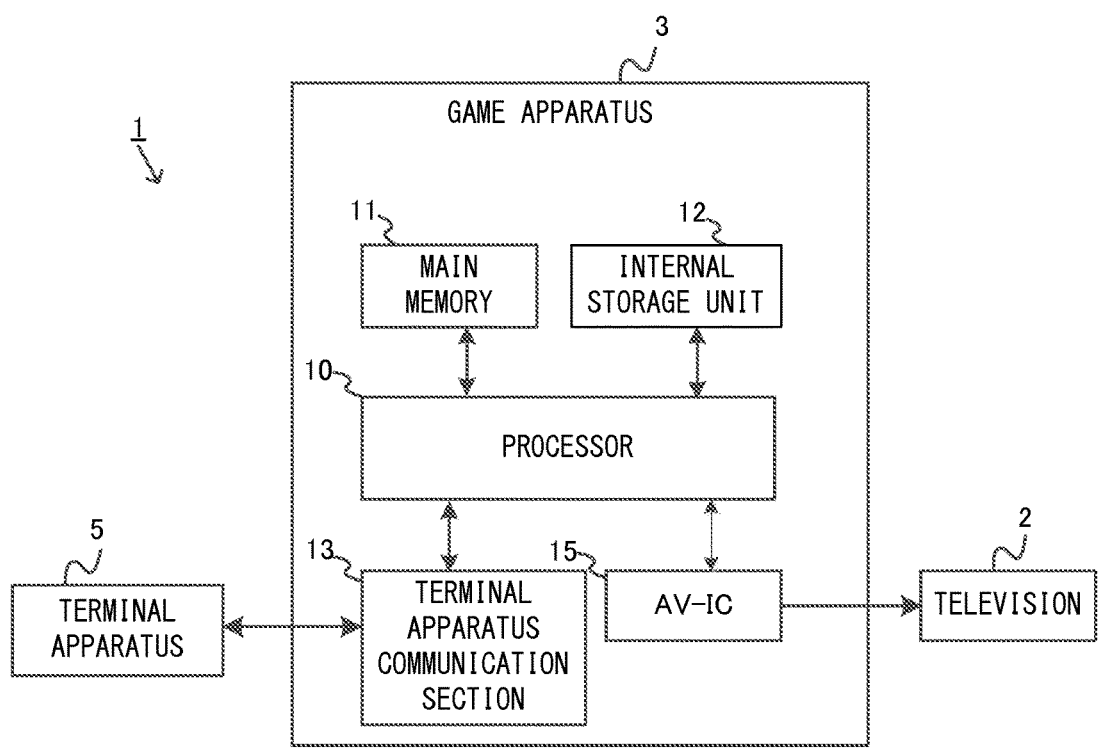
FIG. 2 is a block diagram showing an internal structure of a game apparatus 3.

Next, with reference to FIG. 2, the internal configuration of the game apparatus 3 will be described. FIG. 2 is a block diagram showing the internal configuration of the game apparatus 3. The game apparatus 3 includes a processor 10, a main memory 12, an internal storage unit 12, a terminal apparatus communication section 13, an AV-IC 15, and the like. Although not shown in the figure, the game apparatus 3 further includes a disc drive that reads program data, texture data, and the like from the optical disc, and writes the read data in an internal main memory or the main memory 11.

The processor 10 executes the game program stored in the optical disc (not shown) or the internal storage unit 12 to execute the game processing, and acts as a game processor. The processor 10 is connected to the main memory 11, the internal storage unit 12, the terminal apparatus communication section 13, and the AV-IC 15. The volatile main memory 11 stores a program such as the game program read from the optical disc or the game program read from the internal storage unit 12, and stores various data. The volatile main memory 11 is used as a work area and a buffer area for the processor 10. The internal storage unit 12 is a flash memory or a hard disk drive, for example.

Although not shown in the figure, the processor 10 includes an input/output processor (I/O processor), a GPU (Graphics Processor Unit), a DSP (Digital Signal Processor), a VRAM (Video RAM), and an internal main memory. The GPU forms a part of rendering means, and generates an image in accordance with a predetermined graphics command (image generation command). The VRAM stores necessary data (data such as polygon data, texture data, and the like) for the GPU to execute the graphics command. When an image is generated, the GPU generates image data using data stored in the VRAM. In the present embodiment, the game apparatus 3 generates both a game image to be displayed on the television 2 and a game image to be displayed on the terminal apparatus 5. Hereinafter, occasionally, the game image to be displayed on the television 2 is referred to as a "television game image", and the game image to be displayed on the terminal apparatus 5 is referred to as a "terminal game image".

The DSP acts as an audio processor, and generates audio data by using sound data and acoustic waveform (timbre) data that are stored in the internal main memory or the main memory 11. In the present embodiment, a game sound is generated in a similar manner to a game image, that is, both a game sound to be output from the loudspeakers of the television 2 and a game sound to be output from the loudspeaker of the terminal apparatus 5 are generated.

Data of, among images and sounds generated by the game apparatus 3 as described above, an image and a sound to be output from the television 2 is read by the AV-IC 15. The AV-IC 15 outputs the read image data to the television 2, and also outputs the read audio data to the loudspeakers 2L and 2R built in the television 2. This causes the image to be displayed on the television 2, and also causes the sound to be output from the loudspeakers 2L and 2R.

Data of, among images and sounds generated by the game apparatus 3, an image and a sound to be output from the terminal apparatus 5 is transmitted to the terminal apparatus 5 via the terminal apparatus communication section 13.

The game apparatus 3 is able to transmit/receive data of images, sounds, and the like to/from the terminal apparatus 5. When transmitting a game image (terminal game image) to the terminal apparatus 5, the processor 10 performs a predetermined compression process on the data of the game image generated by the GPU. The compressed image data is transmitted to the terminal apparatus 5 by the terminal apparatus communication section 13. In the present embodiment, the image data transmitted from the game apparatus 3 to the terminal apparatus 5 is used for a game, and if some delay occurs in the image to be displayed in the game, the operability of the game is adversely affected. Therefore, the transmission of the image data from the game apparatus 3 to the terminal apparatus 5 is performed so as to cause as little such delay as possible. Therefore, in the present embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted.

The game apparatus 3 transmits, to the terminal apparatus 5, audio data as well as the image data. That is, the processor 10 performs compression on the audio data generated by the DSP in a similar manner to that for the image data. Then, the processor 10 transmits the compressed image data and audio data to the terminal apparatus 5 via the terminal apparatus communication section 13.

The game apparatus 3 transmits, as well as the image data and the audio data described above, various control data to the terminal apparatus 5 according to need.

In addition, the game apparatus 3 is able to receive various data from the terminal apparatus 5. In the present embodiment, the terminal apparatus 5 transmits operation data. The operation data transmitted from the terminal apparatus 5 is received by the terminal apparatus communication section 13. The operation data received by the terminal apparatus communication section 13 is output to the processor 10. The processor 10 stores (temporarily stores) the data received from the terminal apparatus 5 in a buffer area of the internal main memory or the main memory 11.

Regarding the processor 10, processing described later may be performed by the single processor 10, or may be performed by a plurality of processors 10 mounted to the single game apparatus 3. In addition, the processor 10 may be a single-core type processor or a multiple-core type processor.

[3. Configuration of Terminal Apparatus 5]

Figure 3:
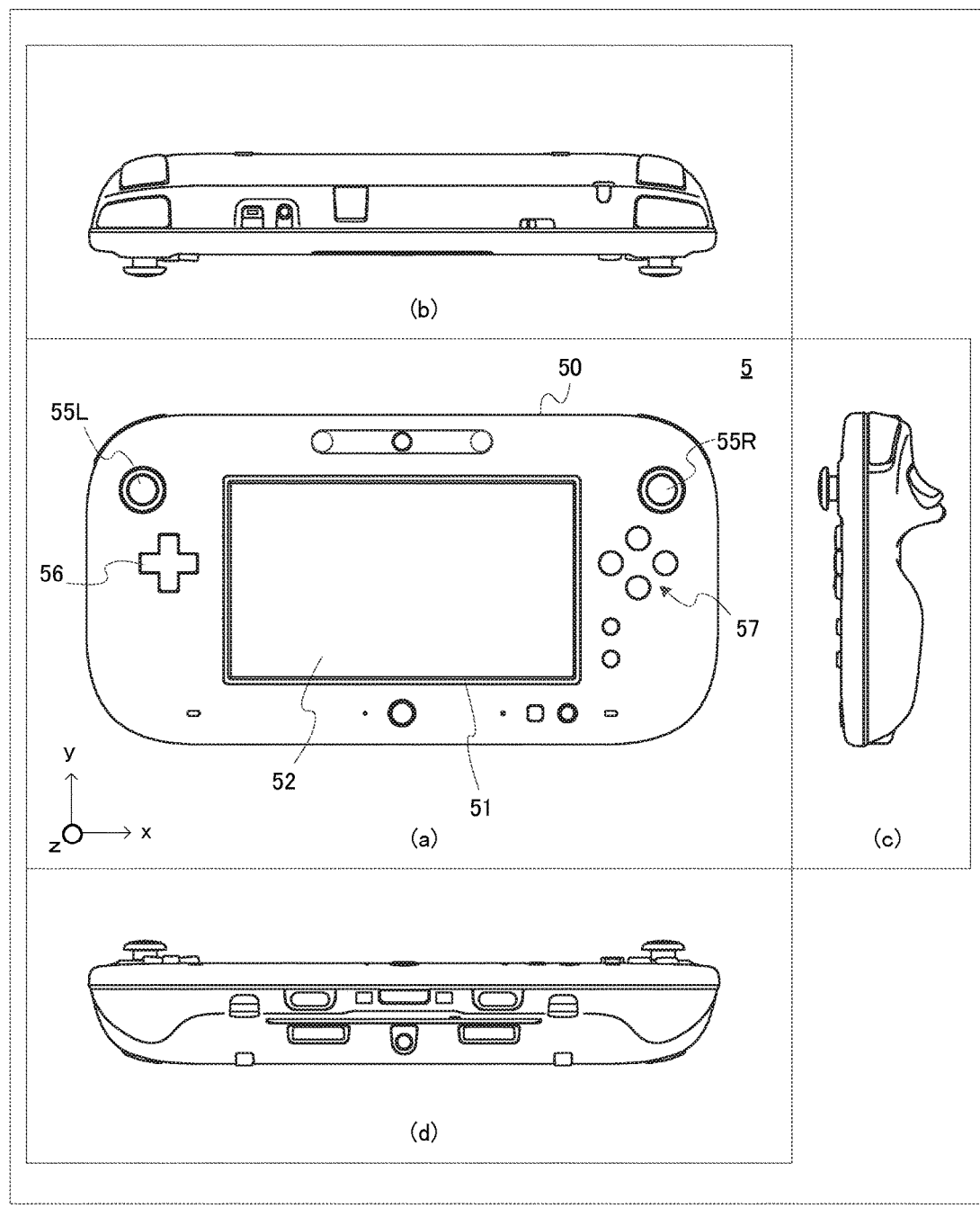
FIG. 3 shows an external structure of a terminal apparatus 5.

Next, with reference to FIG. 3, the configuration of the terminal apparatus 5 will be described. FIG. 3 is a diagram showing an external configuration of the terminal apparatus 5. In FIG. 3, (a) is a front view of the terminal apparatus 5, (b) is a top view thereof, (c) is a right side view thereof, and (d) is a bottom view thereof.

As shown in FIG. 3, the terminal apparatus 5 includes a housing 50 that generally has a horizontally long plate-like rectangular shape. The housing 50 is small enough to be held by a user. Therefore, the user is allowed to move the terminal apparatus 5 with hands or change the location of the terminal apparatus 5.

The terminal apparatus 5 has an LCD 51 on the front surface of the housing 50. The LCD 51 is provided near the center of the front surface of the housing 50. Therefore, the user can hold and move the terminal apparatus 5 while viewing a screen of the LCD 51, by holding the housing 50 at portions to the right and left of the LCD 51.

As shown in (a) of FIG. 3, the terminal apparatus 5 includes a touch panel 52 on the screen of the LCD 51, as operation means. In the present embodiment, the touch panel 52 is, but is not limited to, a resistive film type touch panel. The touch panel may be of any type such as an electrostatic capacitance type. The touch panel 52 may be of a single touch type or a multiple touch type. In the present embodiment, the touch panel 52 has the same resolution (detection accuracy) as that of the LCD 51. The resolution of the touch panel 52 and the resolution of the LCD 51, however, may not necessarily be the same. Although an input on the touch panel 52 is usually made by using a touch pen, a finger of a user may be used for making a input on the touch panel 52. The housing 50 may have an insertion opening for accommodating a touch pen used to perform an operation on the touch panel 52. Thus, the terminal apparatus 5 includes the touch panel 52. Therefore, the user can operate the touch panel 52 while moving the terminal apparatus 5. That is, the user can directly (through the touch panel 52) perform an input to the screen of the LCD 51 while moving the screen of the LCD 51.

As shown in FIG. 3, the terminal apparatus 5 has, as operation means, two analog sticks 55L and 55R, a cross button 56, and a plurality of operation buttons 57. Each of the analog sticks 55L and 55R is a device for designating a direction. That is, each of the analog sticks 55L and 55R is a direction input device capable of, when an input operation is performed in a predetermined direction, outputting an intermediate value in an input performed until the direction input device reaches, from a neutral state which is a non-operation state, a limit position to which an input in the direction is enabled. Therefore, in another embodiment, analog pads or the like may be used instead of the analog sticks 55L and 55R. Each of the analog sticks 55L and 55R is configured such that a stick part thereof to be operated by a finger of the user is slidable or tiltable in any direction (at any angle in any direction such as the upward, the downward, the rightward, the leftward, or the diagonal direction) with respect to the front surface of the housing 50. The left analog stick 55L is provided to the left of the screen of the LCD 51, and the right analog stick 55R is provided to the right of the screen of the LCD 51. Therefore, the user is allowed to perform an input for designating a direction using the analog stick with either the left or right hand. Further, the analog sticks 55L and 55R are positioned so as to be operated by the user holding the right and left portions of the terminal apparatus 5. Therefore, the user is allowed to easily operate the analog sticks 55L and 55R when the user holds and moves the terminal apparatus 5.

The buttons 56 and 57 are each operation means for performing a predetermined input. The buttons 56 and 57 are positioned so as to be operable by the user holding the right and left portions of the terminal apparatus 5. Therefore, the user is allowed to easily operate these operation means when the user holds and moves the terminal apparatus 5.

As shown in (a) of FIG. 3, the cross button (direction input button) 56 and the four buttons 57 are provided on the front surface of the housing 50. That is, these buttons are positioned so as to be operable by a thumb of the user.

The cross button 56 is provided to the left of the LCD 51 and beneath the left analog stick 55L. That is, the cross button 56 is positioned so as to be operated by the left hand of the user. The cross button 56 is cross-shaped, and is capable of indicating an upward, a downward, a leftward, or a rightward direction. The four buttons 57 are provided to the right of the LCD 51 and beneath the right analog stick 55R. That is, the four operation buttons 57 are positioned so as to be operable by the right hand of the user. Further, the four operation buttons 57 are positioned upward, downward, leftward, and rightward, respectively, with respect to a center position of the four operation buttons 57. Therefore, the terminal apparatus 5 may cause the four operation buttons 57 to act as buttons which allow the user to designate an upward, a downward, a leftward, or a rightward direction.

As an operation button other than the above-described buttons, an operation button is also provided beneath the LCD 51. Further, a first L button and a first R button are also provided on upper diagonal portions (an upper left portion and an upper right portion) of the housing 50. Further, a second L button and a second R button are also provided on leg parts provided so as to protrude from the rear surface (i.e., the surface opposite to the front surface on which the LCD 51 is provided) of the plate-shaped housing 50.

In the terminal apparatus 5 shown in FIG. 3, the shapes of the operation buttons and the housing 50, the numbers and the installation positions of the components are merely illustrative, and may be other shapes, numbers, and installation positions.

[4. Internal Configuration of Terminal Apparatus 5]

Figure 4:
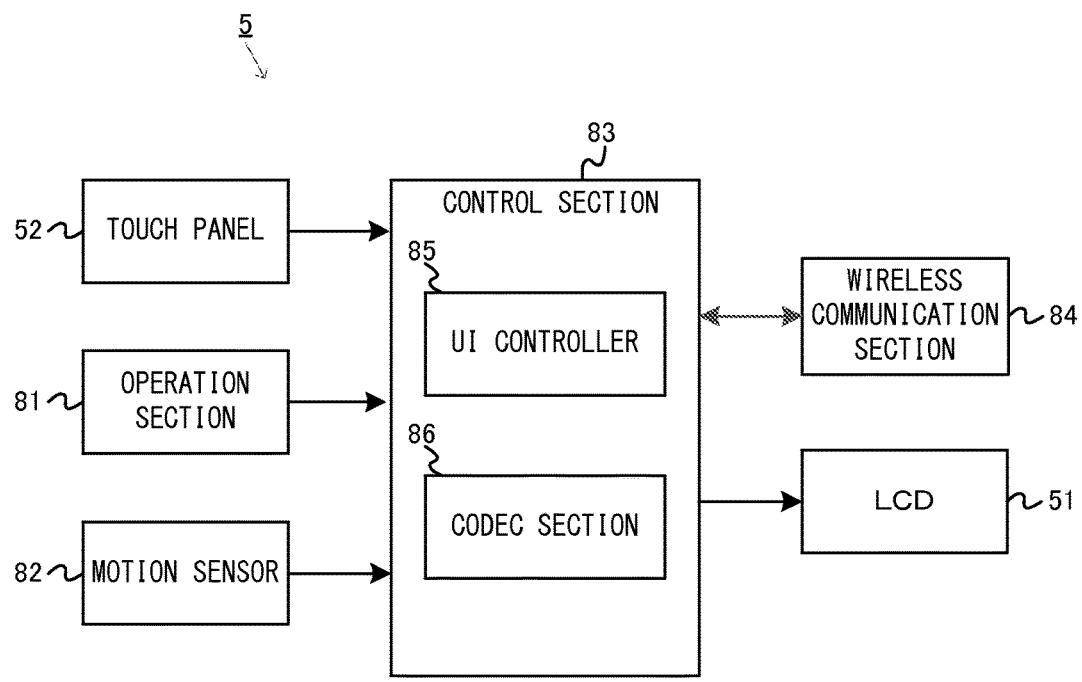
FIG. 4 is a block diagram showing an internal structure of the terminal apparatus 5.

Next, with reference to FIG. 4, the internal configuration of the terminal apparatus 5 will be described. FIG. 4 is a block diagram showing the internal configuration of the terminal apparatus 5. As shown in FIG. 4, the terminal apparatus 5 includes a motion sensor 82, a control section 83, a wireless communication section 84, and the like, in addition to the LCD 51, the touch panel 52, and an operation section 81 corresponding to the analog sticks 55L and 55R, the cross button 56, and the plurality of buttons 57. These electronic components are mounted on an electronic circuit substrate, and accommodated in the housing 50.

The motion sensor 82 is a sensor for detecting a motion applied to the terminal apparatus 5, the attitude of the terminal apparatus 5, and the like. In the present embodiment, an acceleration sensor, an angular velocity sensor (gyro sensor), and a magnetic sensor are provided as the motion sensor 82. The acceleration sensor detects the magnitudes of linear accelerations along three axial directions (the x-axis, y-axis, and z-axis directions shown in (a) of FIG. 3). Specifically, in the acceleration sensor, the long side direction of the housing 50 is defined as the x-axis direction, the short side direction of the housing 50 is defined as the y-axis direction, and the direction orthogonal to the front surface of the housing 50 is defined as the z-axis direction, thereby detecting the magnitudes of the linear accelerations in the respective axis directions. Acceleration data representing the detected accelerations is output to the control section 83. The angular velocity sensor detects the angular velocities about the three axes, i.e., the x axis, the y axis, and the z axis described above. Angular velocity data representing the detected angular velocities is output to the control section 83. The magnetic sensor detects an orientation by sensing the magnitude and the direction of a magnetic field. Orientation data representing the detected orientation is output to the control section 83.

The control section 83 includes a UI controller 85, a codec section 86, and the like. The UI controller 85 controls input/output of data to/from various input/output sections. The codec section 86 performs compression of data to be transmitted to the game apparatus 3, and decompression of data transmitted from the game apparatus 3. The control section 83 transmits operation data obtained from the touch panel 52, the operation section 81 (the analog sticks 55L and 55R, the cross button 56, the plurality of buttons 57, and the like), and the motion sensor 82, as terminal operation data to the game apparatus 3 via the wireless communication section 84. In addition, as described above, compressed image data and compressed audio data are transmitted from the game apparatus 3 to the terminal apparatus 5. These data are transmitted via the wireless communication section 84 to the control section 83. The control section 83 (the codec section 86 thereof) decompresses the received image data and audio data. The decompressed image data is outputted to the LCD 51, and an image is displayed on the LCD 51 (a terminal game image is displayed thereon). In addition, the decompressed audio data is output to a sound IC (not shown), and the sound IC causes a sound to be output from a loudspeaker (not shown) (a terminal game sound is output therefrom).

[5. Summary of Operation of Information Processing According to Present Embodiment]

Figure 5:
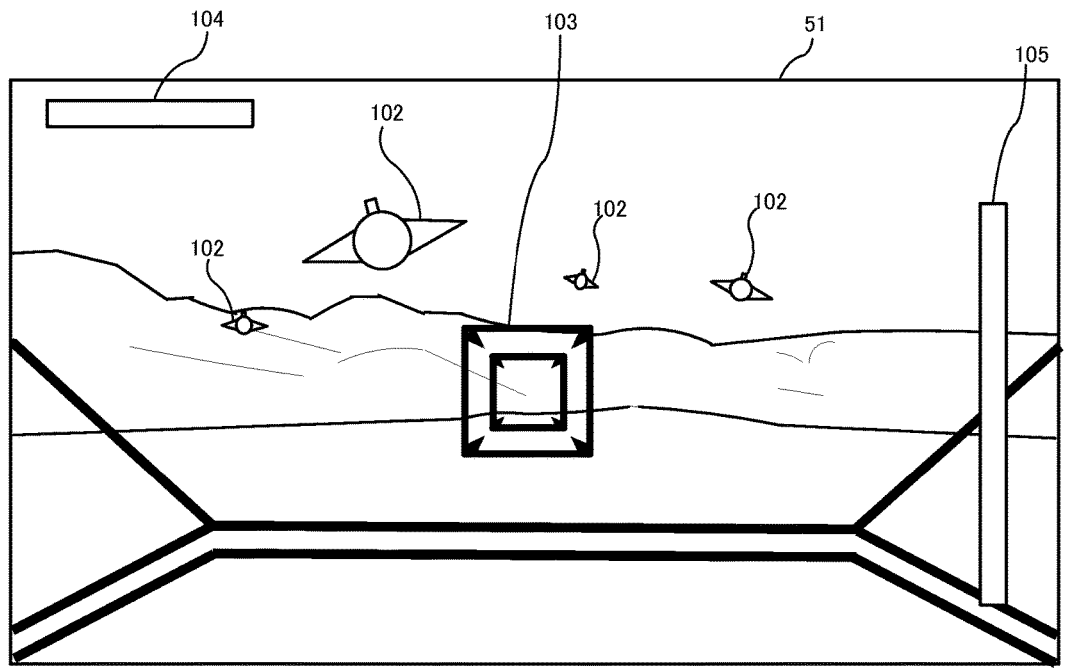
FIG. 5 shows an example of a game screen of game processing according to the embodiment.
Figure 6:
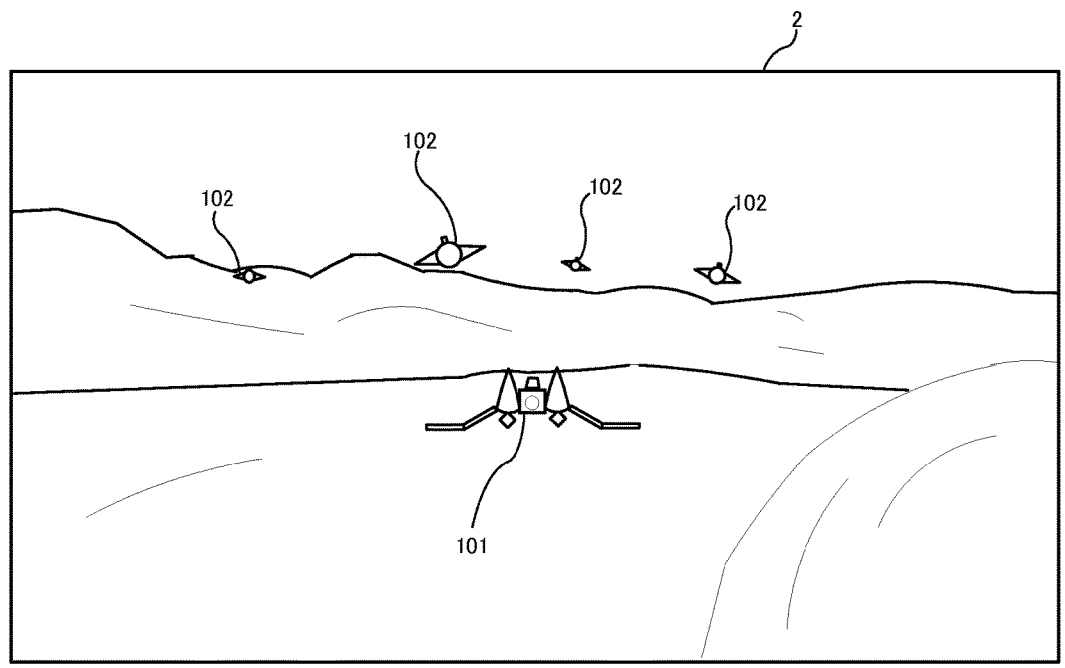
FIG. 6 shows an example of a game screen of the game processing according to the embodiment.

Next, the summary of operation of information processing executed by the information processing system according to the present embodiment will be described. As an example of information processing according to the present embodiment, game processing is assumed. More specifically, a 3D flight shooting game is assumed. FIG. 5 and FIG. 6 are diagrams showing an example of game screens of the game processing according to the present embodiment. FIG. 5 shows an example of a terminal game image, and FIG. 6 shows an example of a television game image. In this game, a player object is a fighter plane 101. In a virtual 3D game space (hereinafter referred to as a "virtual game space"), the fighter plane 101 is caused to move (fly) and attack (shoot) enemy objects 102. The moving direction of the fighter plane 101 can be changed to any direction within 360 degrees.

Figure 7:
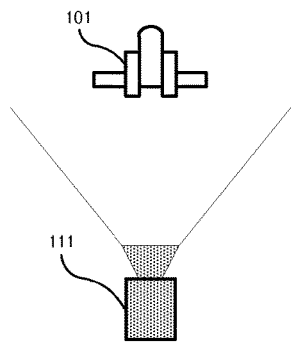
FIG. 7 is a schematic diagram showing the positional relationship between a fighter plane 101 and a virtual camera in a television game image.
Figure 8:
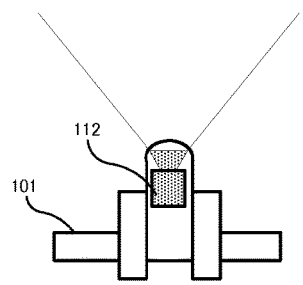
FIG. 8 is a schematic diagram showing the positional relationship between the fighter plane 101 and a virtual camera in a terminal game image.

The terminal game image shown in FIG. 5 is rendered as viewed from the cockpit of the fighter plane. In other words, the terminal game image is an image viewed from the viewpoint of a pilot, that is, an image viewed from a so-called first-person viewpoint. In contrast, the television game image shown in FIG. 6 is rendered as viewed from behind the fighter plane 101. The television game image is an image viewed from a so-called third-person viewpoint, and a virtual camera is controlled so as to follow the rear of the fighter plane. That is, there are two virtual cameras in the same virtual game space, and the two virtual cameras shoot the virtual game space from different positions. FIG. 7 shows the positional relationship between the fighter plane 101 and the virtual camera in the television game image. FIG. 8 shows the positional relationship between the fighter plane 101 and the virtual camera in the terminal game image. In any case, as a general rule, the imaging direction of the virtual camera is the nose direction (moving direction) of the fighter plane 101. The position of the virtual camera is changed as appropriate with a movement of the fighter plane 101 while maintaining the positional relationship as shown in FIG. 7 or FIG. 8. In the following description, the virtual camera used for generating the television game image is referred to as a first virtual camera 111, and the virtual camera used for generating the terminal game image is referred to as a second virtual camera 112.

In the terminal game image shown in FIG. 5, the state of the virtual game space viewed from the cockpit is rendered (the enemy objects 102 and the like are also rendered). In addition, a shooting aim 103 and various meters 104 and 105 are also rendered in the terminal game image. The shooting aim 103 represents the attack direction (shooting direction) of the fighter plane. In the present embodiment, as an initial value of the position of the shooting aim 103, the attack direction is set to the nose direction of the fighter plane. In the present embodiment, in the terminal game image, the shooting aim 103 is fixedly rendered at a center portion of the image (screen). In other words, the shooting aim 103 is located at a position along the imaging direction of the first virtual camera, and consequently, is fixedly rendered at the center portion of the screen. The meters 104 and 105 represent, for example, the remaining amount of energy, the velocity, and the like of the fighter plane 101. That is, these meters are displays corresponding to various meters of the fighter plane. In this game, it is assumed that a player plays the game while basically viewing the terminal game image. Therefore, the displays corresponding to these meters are displayed on the terminal game image to enhance the player's convenience. However, in the present embodiment, a display corresponding to a so-called "radar", which represents presence of an enemy around the own plane, is not displayed on the terminal game screen. In another embodiment, a display corresponding to a so-called "radar" may be displayed on the terminal game screen.

Regarding the shooting aim 103, a "shooting aim object" may be generated and located in the virtual game space (for example, at a position in the nose direction of the fighter plane 101 and apart from the nose of the plane by a predetermined distance). Alternatively, the shooting aim 103 may be realized, not in a form of an object, but in a process of rendering an image of the shooting aim 103 in the terminal game image (for example, rendering an image of a shooting aim so as to be superimposed on an image taken by the second virtual camera 112).

On the television game screen shown in FIG. 6, the state of the virtual game space is rendered based on the third-person viewpoint as described above. On this screen, the objects such as the shooting aim 103 and the various meters 104 and 105, which are displayed on the terminal game image, are not displayed at all. That is, only the state of the virtual game space viewed from behind the fighter plane 101 is displayed. Since the television game screen is displayed on the television 2, users other than the player can also view it. Thus, the television game screen also serves as a so-called live camera. Further, on the television game screen, the fighter plane 101 (player object) is always displayed (present). Since the television game image is rendered based on the viewpoint from behind the fighter plane 101, the player can easily recognize the surroundings of the fighter plane 101 as compared to the case of the terminal game image. Therefore, the television game screen, when viewed by the player, can be utilized as a radar screen that allows the player to recognize the surroundings of the fighter plane 101.

Next, the outline of processing executed with the configuration using the two screens as described above will be described. The processing described in the present embodiment mainly relates to an operation to move the fighter plane and an operation to control the direction of the shooting aim. Although the direction of the shooting aim can also be regarded as the attack direction or the shooting direction, it is referred to as a "aiming direction" in the following description.

Regarding the above-mentioned operations, two operation systems are used in combination in the present embodiment. Specifically, as a "first operation", the player is allowed to change the moving direction of the fighter plane 101 and the aiming direction in coordination with each other by operating the left analog stick 55L. As a "second operation", the player is allowed to change only the aiming direction by moving the terminal apparatus 5 itself, based on the attitude of the terminal apparatus 5.

Figure 9:
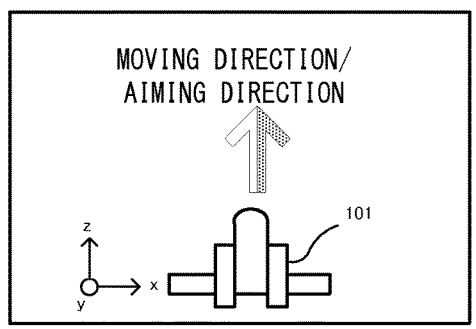
FIG. 9 is a diagram illustrating a first operation.
Figure 10:
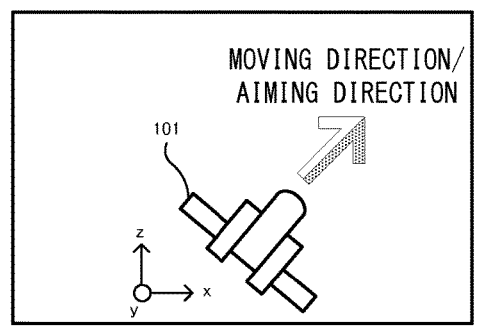
FIG. 10 is a diagram illustrating the first operation.
Figure 11:
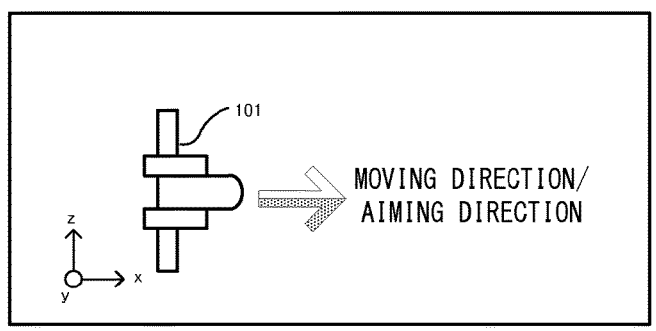
FIG. 11 is a diagram illustrating the first operation.

The first operation will be described with reference to FIGS. 9 to 11. FIG. 9 shows the fighter plane 101 looked down from above. In FIG. 9, the moving direction of the fighter plane 101 is a z axis positive direction (a perspective direction in the terminal game image and the television game image). The aiming direction coincides with the moving direction. In this state, it is assumed that the player performs, for example, rightward direction input by using the left analog stick 55L. In this case, as shown in FIG. 10 and FIG. 11, the fighter plane 101 takes an action to turn right. As a result, the moving direction of the fighter plane 101 is changed to an x axis positive direction, and accordingly, the aiming direction is also changed to the x axis positive direction. That is, in the case of the first operation, the moving direction of the fighter plane 101 and the aiming direction can be changed.

Next, the second operation will be described with reference to FIGS. 12 to 23. In the following description, a case will be described where the player attempts to change the aiming direction rightward when the state of the fighter plane 101 is as shown in FIG. 9. FIGS. 12 to 14 are schematic views showing the operation by the player to change the aiming direction rightward. In these figures, the player is looked down from above. First, as shown in FIG. 12, the player plays the game with the terminal apparatus 5 being substantially parallel to the television 2. In this state, as shown in FIG. 9, the fighter plane 101 is moving in the z axis positive direction in the virtual game space. From this state, the player slightly turns the terminal apparatus 5 rightward about the y axis. The manner of turning the terminal apparatus 5 is as follows. That is, as shown in FIG. 13, the player may turn the terminal apparatus 5 by moving only his/her arms or wrists while the player himself/herself faces the television 2. Alternatively, as shown in FIG. 14, the player himself/herself may turn rightward.

Figure 17:
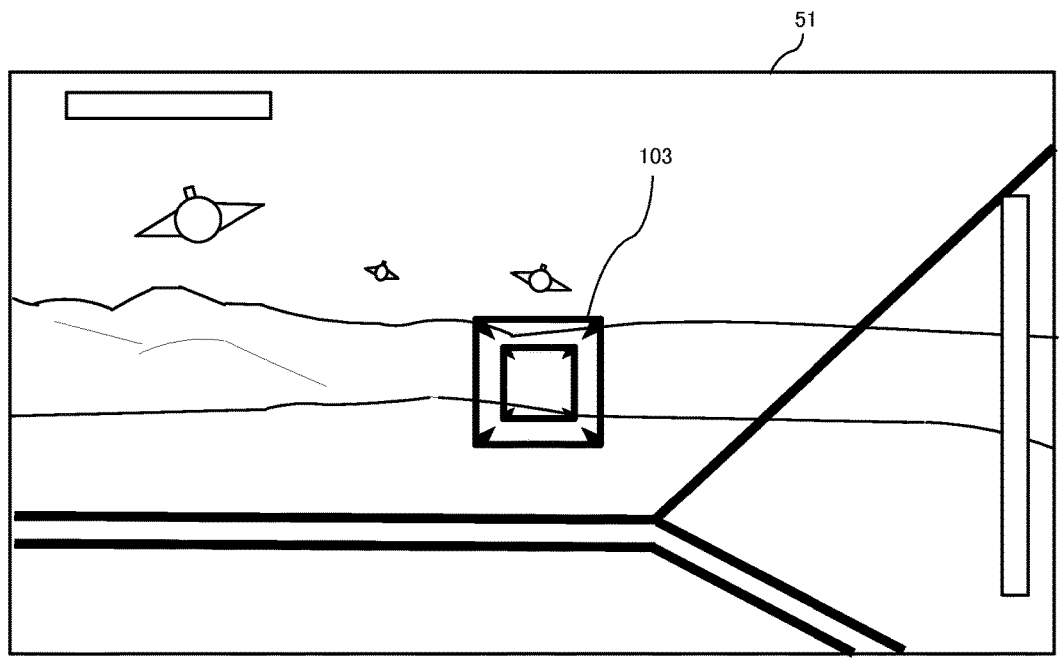
FIG. 17 is a diagram illustrating the second operation.

The above operation causes the back surface of the terminal apparatus 5 to slightly turn rightward relative to the attitude shown in FIG. 12. This attitude of the terminal apparatus 5 is calculated based on an output from the motion sensor 82 built into the terminal apparatus 5, and the aiming direction is changed in accordance with the attitude (the direction of the terminal apparatus 5). Specifically, as shown in FIG. 15, only the aiming direction is slightly changed toward the x axis positive direction (rightward) with the moving direction of the fighter plane 101 remaining in the z axis positive direction. The direction of the virtual camera (imaging direction) in this state is as shown in FIG. 16. That is, the direction of the second virtual camera is changed rightward in accordance with the change in the aiming direction. On the other hand, the direction of the first virtual camera is unchanged. As a result, there is no significant change in the television game image on the screen (only a change corresponding to the movement of the fighter plane 101 in the moving direction). On the other hand, regarding the terminal game image, as shown in FIG. 17, an image in which the line of sight slightly turns rightward as compared to the image shown in FIG. 5 is displayed (the shooting aim 103 itself is rendered at substantially the center of the screen as described above). That is, the operation to change only the aiming direction with the moving direction of the fighter plane 101 being unchanged is realized.

Figure 18:
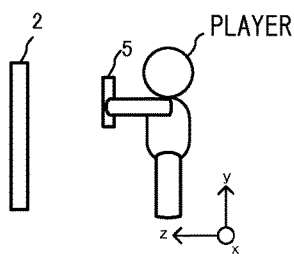
FIG. 18 is a diagram illustrating the second operation.
Figure 19:
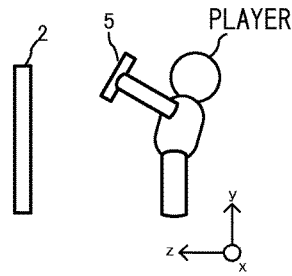
FIG. 19 is a diagram illustrating the second operation.
Figure 20:
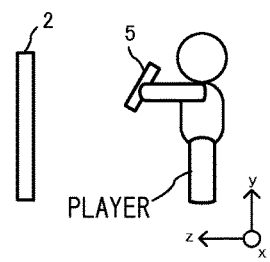
FIG. 20 is a diagram illustrating the second operation.
Figure 21:
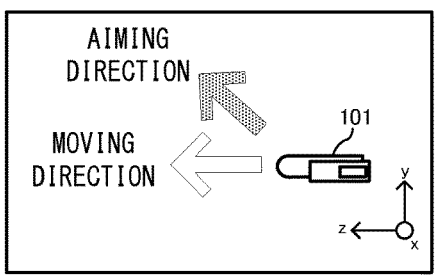
FIG. 21 is a diagram illustrating the second operation.
Figure 22:
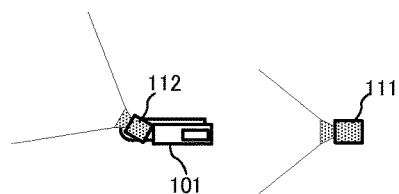
FIG. 22 is a diagram illustrating the second operation.
Figure 23:
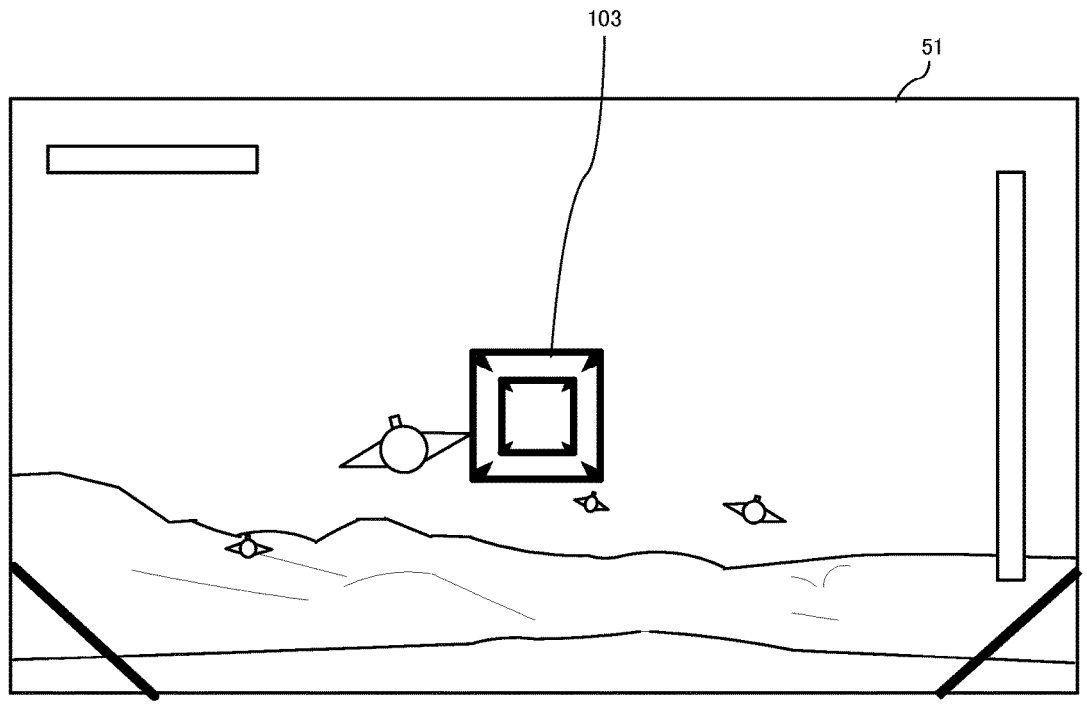
FIG. 23 is a diagram illustrating the second operation.

As another example of the second operation, FIGS. 18 to 23 show a case where the terminal apparatus 5 is slightly turned upward, that is, a case where the terminal apparatus 5 is turned about the x axis shown in FIG. 3. FIGS. 18 to 20 are schematic views showing the operation by the player to turn the terminal apparatus 5 upward. FIG. 18 shows a state where the player plays the game with the terminal apparatus 5 being substantially parallel to the television 2. From this state, the player himself/herself slightly turns upward as shown in FIG. 19, or the player performs an operation to slightly turn the terminal apparatus 5 upward by moving only his/her wrists while facing the front as shown in FIG. 20. When the player performs such an operation, only the aiming direction changes upward as shown in FIG. 21. Further, regarding the directions of the virtual cameras, as shown in FIG. 22, the direction of the second virtual camera (imaging direction) is changed upward with the change in the aiming direction, but the direction of the first virtual camera is not changed. As the terminal game image, an image in which the line of sight is slightly turned upward as compared to the image shown in FIG. 5 is displayed as shown in FIG. 23.

Figure 24:
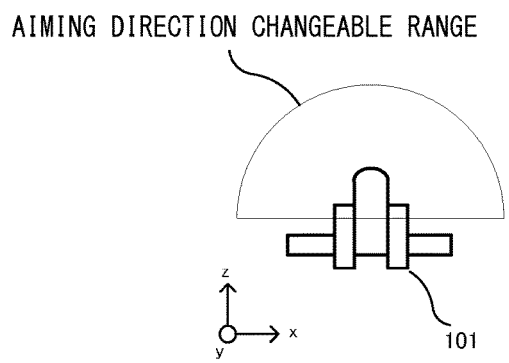
FIG. 24 is a schematic diagram showing a range in which an aiming direction can be changed.
Figure 24:
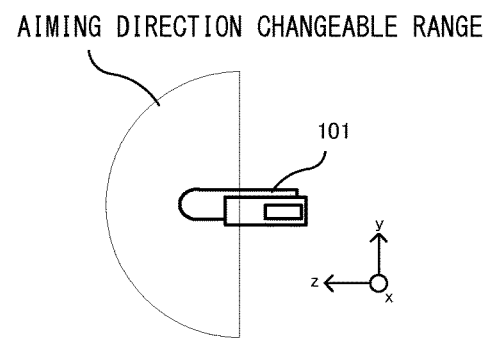

Supplemental description will be given of a range in which the aiming direction can be changed in the second operation. In the present embodiment, the aiming direction can be changed within a range of a hemisphere in front of the fighter plane 101 as shown in FIG. 24. Therefore, for example, it is possible to change the aiming direction so as to aim at an enemy object that is right above or below the fighter plane 101, with the moving direction of the fighter plane 101 being fixed to the forward direction. In another embodiment, the range in which the aiming direction can be changed is not limited to the hemisphere range.

As described above, according to the present embodiment, the moving direction of the fighter plane 101 and the aiming direction can be changed by the first operation using the analog stick 55L, and only the aiming direction can be changed by the second operation to move the terminal apparatus 5 itself. Thereby, the player is allowed to perform, by the first operation, control of the moving direction and rough adjustment of the shooting aim, and to conduct an attack by using the second operation when he/she desires to perform minute adjustment of the shooting aim or change only the aiming direction with the moving direction being unchanged. For example, when an enemy object is right above the fighter plane 101, the player is allows to perform an operation to attack the enemy object by shooting upward with the moving direction of the fighter plane 101 being unchanged, or an operation to shoot the enemy object while flying away from the enemy object with the back of fighter plane 101 to the enemy object. Using the two operation systems in combination provides a game offering a new operation feeling.

[6. Details of Information Processing According to Present Embodiment]

Next, with reference to FIGS. 25 to 28, the game processing according to the present embodiment will be described in more detail.

Figure 25:
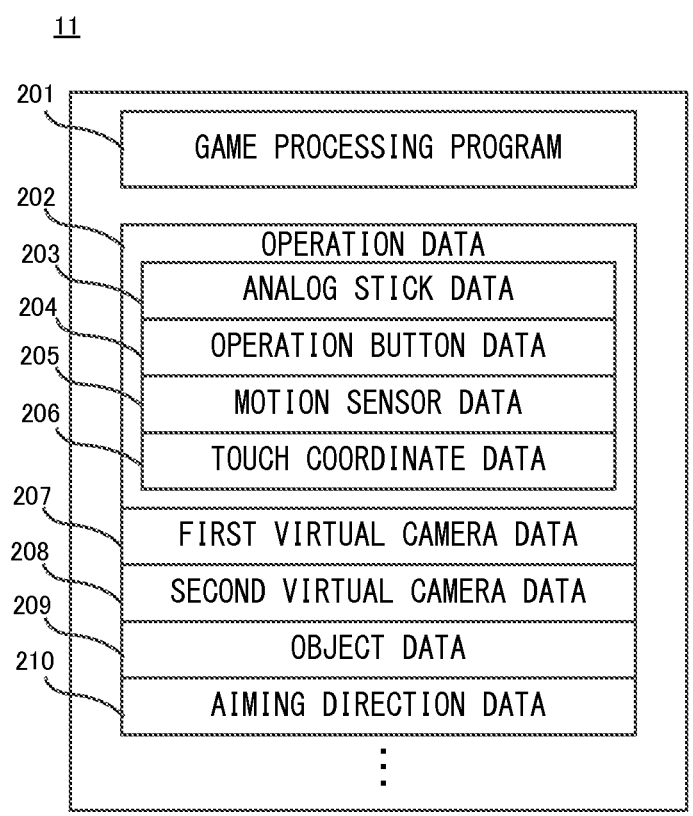
FIG. 25 is a diagram showing examples of a program and information stored in a main memory 11 of the game apparatus 3.

FIG. 25 shows an example of a program and information stored in the memory 11 of the game apparatus 3. A game processing program 201, operation data 202, first virtual camera data 207, second virtual camera data 208, object data 209, aiming direction data 210, and the like are stored in the main memory 11.

The game processing program 201 is a program for executing a process to control the moving direction of the fighter plane 101 and the aiming direction as described above, and the like. Specifically, the game processing program 201 is a program for executing a process in a flowchart of FIG. 26 described later.

The operation data 202 is data indicating various operations performed on the terminal apparatus 5. The operation data 202 includes analog stick data 203, operation button data 204, motion sensor data 205, and touch coordinate data 206. The analog stick data 203 is data indicating the content of operation performed to the analog sticks 55L and 55R. The analog stick data 203 can be regarded as operation data relating to the first operation. The operation button data 204 is data indicating the content of operation performed to the various buttons such as the buttons 56 and 57 (whether or not each button is being pressed). The motion sensor data 205 is data output from the motion sensor 82, and includes acceleration data and angular velocity data. In the present embodiment, the content of the second operation (the attitude, the turning direction, and the like of the terminal apparatus) is determined by mainly using the angular velocity data. The touch coordinate data 206 is data indicating touch coordinates and the like of the touch panel 52.

The first virtual camera data 207 is data indicating the position, the direction, the angle of view, and the like of the first virtual camera 111 in the virtual space. The second virtual camera data 208 is data indicating the position, the direction, the angle of view, and the like of the second virtual camera 112 in the virtual space. The object data 209 is data relating to the fighter plane 101 (player object) and the enemy objects. The object data 209 includes model data of each object, and data indicating the position, the direction, the moving direction, and the like of each object in the virtual game space. The aiming direction data 210 is data indicating the above-described aiming direction.

Next, a flow of a process executed by the processor 10 of the game apparatus 3 will be described with reference to the flowcharts of FIGS. 26 to 28. In the following description, controls relating to the first operation and the second operation will be mainly described, and detailed description for other game processing will be omitted. For convenience of description, it is premised that the first operation and the second operation are not performed at the same time. If both operations are performed at the same time, control of the aiming direction may relating to one of the operations may be preferentially performed.

Figure 26:
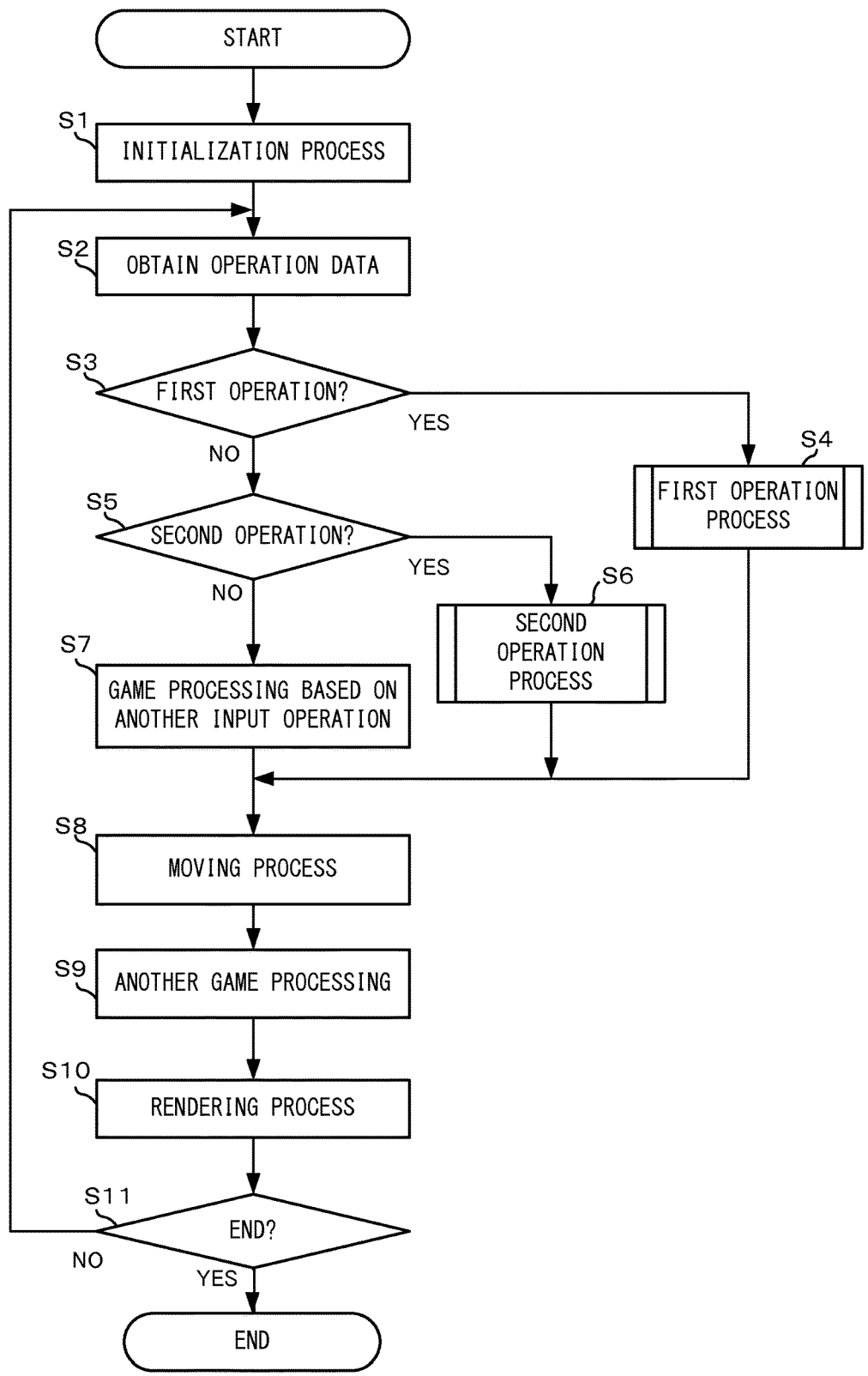
FIG. 26 is a flowchart illustrating, in detail, game processing according to the embodiment.

FIG. 26 is a flowchart showing the game processing of the present embodiment in detail. A process loop of steps S2 to S11 in FIG. 26 is repeatedly executed every 1/60 second (60 frames per second).

When the game processing is started, first, in step 51, the processor 10 executes an initialization process. The initialization process includes the following processes. First, a virtual game space is generated, and then a player object (fighter plane 101), various enemy objects, a topography object, and the like are generated based on the object data 209 and are located in the virtual game space. In addition, various data used for the game processing are initialized.

When the initialization process is completed, next, in step S2, the processor 10 obtains operation data 202. Next, in step S3, the processor 10 determines whether or not the first operation has been performed (whether or not the analog stick 55L has been operated) with reference to the operation data 202. As a result, when the first operation has been performed (YES in step S3), the processor 10 executes a first operation process in step S4, and thereafter, proceeds to step S8 described later.

Figure 27:
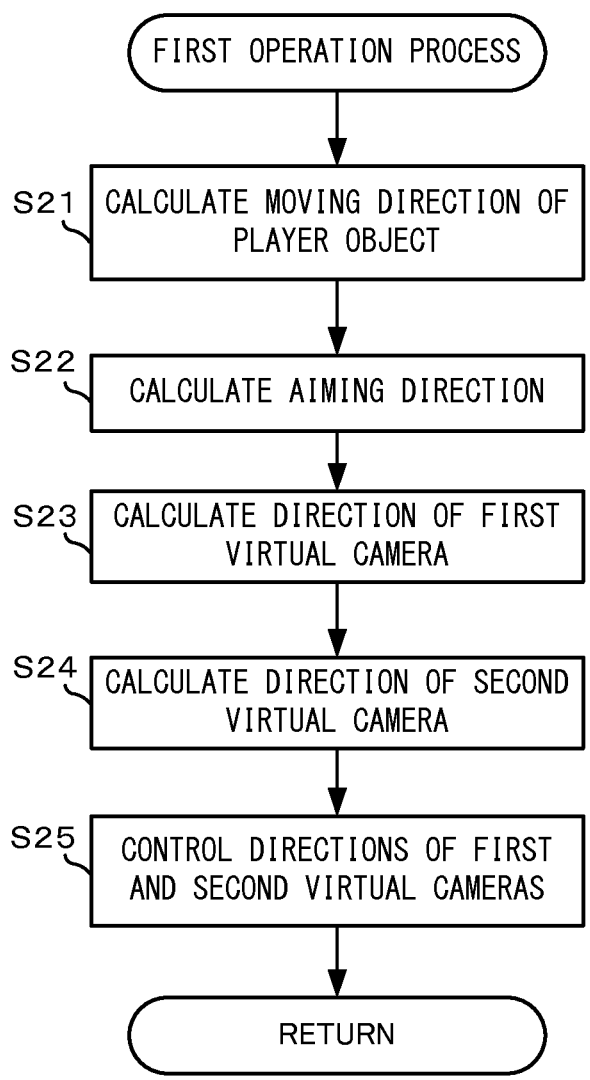
FIG. 27 is a flowchart illustrating, in detail, a first operation process in step S4 shown in FIG. 26.

FIG. 27 is a flowchart showing the details of the first operation process in step S4. First, in step S21, the processor 10 calculates the moving direction of the player object (fighter plane 101), based on the operation data 202 (analog stick data 203).

Next, in step S22, the processor 10 calculates the aiming direction (attack direction), and stores the aiming direction as aiming direction data 210. In this step, the same direction as the moving direction of the player object is calculated as the aiming direction.

Next, in step S23, the processor 10 calculates the direction (imaging direction) of the first virtual camera 111. In this step, the same direction as the aiming direction is calculated as the direction of the first virtual camera 111, and a value indicating the direction is stored in the first virtual camera data 207.

In subsequent step S24, the processor 10 calculates the direction of the second virtual camera 112. In this step, the same direction as the moving direction is calculated as the direction of the second virtual camera 112, and a value indicating the direction is stored in the second virtual camera data 208.

Next, in step S25, the processor 10 controls the directions of the first virtual camera 111 and the second virtual camera 112, based on the first virtual camera data 207 and the second virtual camera data 208. Then, the first operation process is completed. As a result of the first operation process, the moving direction and the aiming direction coincide with each other, and the directions of the first virtual camera and the second virtual camera coincide with each other.

Referring back to FIG. 26, when the result of the determination in step S3 is that the first operation has not been performed (No in step S3), the processor 10 determines, in step S5, based on (the angular velocity data included in) the motion sensor data 205, whether or not the above-described second operation has been performed. Specifically, the processor 10 refers to the motion sensor data 205, and determines, for example, whether or not a change in the angular velocity, which is equal to or greater than a predetermined threshold, occurs. When the result of the determination is that the second operation has been performed (YES in step S5), the processor 10 executes a second operation process in step S6, and thereafter, proceeds to step S8 described later.

FIG. 28 is a flowchart showing the details of the second operation process. In FIG. 28, first, in step S31, the processor 10 calculates the current attitude of the terminal apparatus 5, based on the angular velocity data included in the motion sensor data 205. In another embodiment, the attitude of the terminal apparatus 5 may be calculated based on the acceleration data instead of the angular velocity data, or may be calculated based on both the acceleration data and the angular velocity data.

Next, in step S32, the processor 10 calculates the direction of the terminal apparatus 5 in the z axis positive direction (refer to FIG. 3), and calculates the direction in the virtual game space, corresponding to this direction, and stores the direction as the aiming direction data 210.

Next, in step S33, the processor 10 calculates the direction (imaging direction) of the second virtual camera, based on the calculated aiming direction data 210. That is, the processor 10 sets the direction of the virtual camera to the same direction as the aiming direction, and stores data indicating the direction in the second virtual camera data 208.

Next, in step S34, the processor 10 controls the direction of the second virtual camera 112, based on the calculated second virtual camera data 208. Then, the second operation process is completed. As a result of the second operation process, only the aiming direction (and the direction of the second virtual camera) is changed (the direction of the first virtual camera and the direction of the second virtual camera do not necessarily coincide with each other).

Referring back to FIG. 26, when the result of the determination in step S5 is that the second operation has not been performed (NO in step S5), the processor 10, in step S7, based on the operation data 202, executes game processing based on another input operation (an operation other than the first operation and the second operation). For example, when a shooting operation is performed, the processor 10 executes a process of shooting in the aiming direction. When an operation to change the moving velocity of the player object (fighter plane 101) is performed, the processor 10 changes the moving velocity of the player object based on the content of the operation.

Next, in step S8, the processor 10 executes a movement process. Specifically, the processor 10 executes a process of moving various movable objects (including the player object) in the virtual game space. In addition, the processor 10 also executes a process of moving the first virtual camera 111 and the second virtual camera 112 with the movement of the player object. The player object is moved based on the moving direction and the moving velocity which are set at that time. The enemy objects are moved based on a predetermined algorithm.

Next, in step S9, other game processes are executed. For example, a process of determining whether or not shooting performed by the player object hits is executed. In addition, for example, a process of determining whether or not the player object has made contact with a predetermined item object or topography object is executed. When the player object has made contact with the predetermined object, a game process according to the content of the contact is executed as appropriate (an item acquisition process or the like).

Next, in step S10, the processor 10 executes a rendering process. That is, the processor 10 takes an image of the virtual game space processed as described above, with the first virtual camera 111, to generate a television game image. Further, the processor 10 takes an image of the virtual game space with the second virtual camera 112 to generate a terminal game image. Then, the television game image is output to the television 2, and the terminal game image is transmitted to the terminal apparatus 5. In the terminal apparatus 5, data of the terminal game image is received, and a process of displaying the terminal game image on the LCD 51 is performed based on the data.

Next, in step S11, the processor 10 determines whether or not a condition for ending the game is satisfied. If the condition is not satisfied (NO in step S11), the processor 10 returns to step S2 to repeat the processing. If the condition is satisfied (YES in step S11), the processor 10 ends the game processing.

As described above, in the present embodiment, regarding the operation for the aiming direction (shooting direction), the operation system independent from the operation system for the moving direction of the player object is used. Thereby, only the aiming direction can be changed without changing the moving direction of the player object, which makes the operation for the aiming direction easy.

Further, regarding the operation for the aiming direction, the aiming direction can be changed by the operation to move the terminal apparatus 5 itself as described above. Particularly in the present embodiment, a housing capable of being held by a player is provided with an input device and a display section, and a game image to be viewed by the player while the player plays a game is displayed on the display section. This configuration allows the player to minutely adjust the shooting aim position, and furthermore, allows the player to perform a more intuitive operation.

Further, the two display devices are used as described above, and one of the display devices displays a game image based on a first-person viewpoint while the other displays a game image based on a third-person viewpoint. Further, in the image based on the third-person viewpoint (the television game image described above), the player object is always present in the screen. Therefore, when playing a game, a player basically views the image based on the first-person viewpoint and sometimes views the image based on the third-person viewpoint according to need, and thus the player can easily recognize the surroundings of player object.

In the above-described embodiment, the two display devices (the television 2 and the LCD 51 of the terminal apparatus 5) are used. In another embodiment, one display device may be used. For example, two display areas may be provided on one screen, and the television game image may be displayed on one display area while the terminal game image may be displayed on the other display area.

In the above-described embodiment, the display section (LCD 51), on which the terminal game image, i.e., a game image mainly used by a player to play a game, is included in the input device (included in the same housing (i.e., the terminal apparatus 5) as the input device). In another embodiment, the input device and the display section for displaying the terminal game image may be separated devices (separated housings). For example, a first display device for displaying the television game image, a second display device for displaying the terminal game image, and an input device (controller) separated from these devices, may be provided. The aiming direction may be changed by moving the input device itself as in the above-described embodiment.

In the above-described embodiment, the first operation is the operation of the analog stick 55L, and the second operation is the operation to move the terminal apparatus 5 itself, i.e., the operation using the motion sensor. In another embodiment, this relationship may be reversed. That is, the motion sensor may be used for the first operation (operation regarding the moving direction), and the analog stick 55L (no motion sensor) may be used for the second operation (operation regarding the aiming direction). In still another embodiment, both the first operation and the second operation may be operations using no motion sensor (for example, the first operation is performed with the analog stick 55L and the second operation is performed with the analog stick 55R).

In another embodiment, the shooting aim 103 may not be displayed. That is, calculation and setting of the attack direction (aiming direction) are performed, but no shooting aim may be displayed on the screen.

In the above-described embodiment, control of the moving direction and control of the aiming direction are performed in coordination with each other in the first operation. In another embodiment, only the moving direction may be controlled in the first operation. That is, the moving direction may be controlled in the first operation, and the aiming direction may be controlled in the second operation.

In another embodiment, during game play, the first operation may be changeable from an operation (manual operation) by the player to an "automatic operation" automatically controlled by the processor 10. For example, in the virtual game space, a game stage is prepared in which the player object is requested to move along a predetermined route. When the player plays this stage, the player is allowed to switch between the manual operation and the automatic operation. In this case, while the first operation is controlled under the automatic operation, the player can concentrate on the operation regarding the aiming direction by the second operation (during this period, the process of changing the aiming direction by the first operation may not be performed).

Regarding the positions of the two virtual cameras, in the above-described embodiment, the virtual cameras take images of the virtual game space from different positions. In another embodiment, the two virtual cameras may be located in the same position, and may take images of the virtual game space in different directions. For example, the two virtual cameras are located in the same position behind the fighter plane. Then, the first virtual camera 111 may take an image of the virtual game space in a direction according to the moving direction of the fighter plane, and the second virtual camera 112 may take an image of the virtual game space in a direction opposite to the moving direction.

Figure 29:
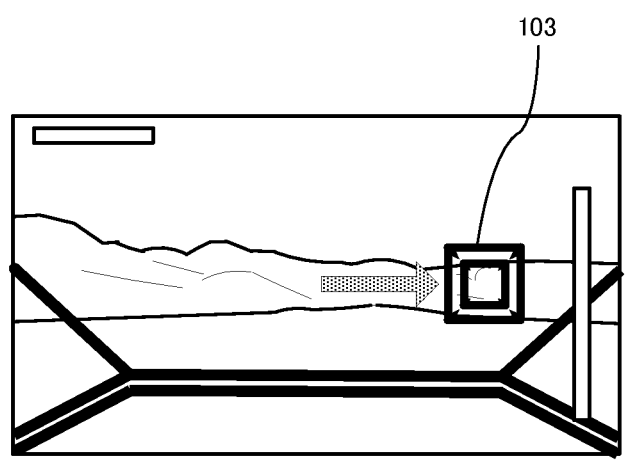
FIG. 29 is a diagram illustrating another example of the second operation process.

In the above-described embodiment, the shooting aim 103 is fixedly displayed in the center of the terminal game image. In another embodiment, the shooting aim 103 is not necessarily displayed fixedly. The shooting aim may be moved in the screen in accordance with a change in the attitude of the terminal apparatus 5 due to the second operation. For example, when the terminal apparatus 5 is turned rightward about the y axis (refer to FIGS. 12 to 14), first, the shooting aim 103 is moved rightward in the screen, with the direction of the first virtual camera 111 being unchanged as shown in FIG. 29. Then, when the shooting aim 103 reaches the right end of the screen, the direction of the first virtual camera 111 may be changed. In still another embodiment, the magnitude of a motion applied to the terminal apparatus 5 may be determined. When the motion is smaller than a predetermined threshold, the shooting aim 103 is moved within the screen with the direction of the first virtual camera being unchanged. When a motion greater than the threshold is applied, the direction of the first virtual camera may also be changed based on the attitude of the terminal apparatus 5.

Since the above embodiment adopts the 3D flight shooting game as an example, the embodiment has been described for the case where the moving direction and the aiming direction (attack direction) are controlled. The above-described embodiment is also applicable to game processing other than the 3D flight shooting game. For example, directions relating to motions of the player object, other than the above-described attack and shooting, may be set by the second operation. For example, a direction in which a camera held by a player object takes an image may be set by the second operation. Further, for example, when a fishing game is assumed in which a player object rides in a small boat, a moving direction of the small boat may be set by the first operation, and a direction in which the player object casts a fishhook may be set by the second operation. Alternatively, a moving direction of an object other than a player object and relating to an attack motion of the player object may be set by the second operation. For example, the shooting aim may be handled as a "shooting aim object". Alternatively, an object for attack, such as a guided missile, may be generated, and the guided missile object may be moved by using the second operation. That is, the above-described embodiment is applicable to a case where the moving direction of the player object is controlled by the first operation while a direction relating to an action other than the movement is controlled by the second operation.

Furthermore, a predetermined position in the virtual game space may be designated based on the second operation, and an aiming direction as described above may be set based on the designated position.

In the above-described embodiment, as an example of the television game image, an image viewed from a third-person viewpoint behind the player object (fighter plane 101) is displayed. In another embodiment, for example, an image from a bird's eye viewpoint or an image from a viewpoint diagonally above the player object may be displayed.

In the above-described embodiment, a series of processes for changing the moving direction and the aiming direction of a player object is performed in a single apparatus. In another embodiment, the series of processes may be performed in an information processing system that includes a plurality of information processing apparatuses. For example, in an information processing system that includes a terminal side apparatus and a server side apparatus communicable with the terminal side apparatus via a network, a part of the series of processes may be performed by the server side apparatus. Alternatively, in an information processing system that includes a terminal side apparatus and a server side apparatus communicable with the terminal side apparatus via a network, a main process among the series of processes may be performed by the server side apparatus, and a part of the series of processes may be performed by the terminal side apparatus. Still alternatively, in the information processing system, a server side system may include a plurality of information processing apparatuses, and the process to be performed in the server side system may be shared and performed by the plurality of information processing apparatuses.

What is claimed is:

1. An information processing apparatus configured to control a player object present in a virtual space by using an input device including a first input section and a second input section different from the first input section, the information processing apparatus comprising one or more processors configured to:

receive inputs from the first input section and the second input section;

set, based on the input from the first input section, a direction of movement of the player object and a direction relating to an action of the player object other than the movement;

while maintaining the direction of movement of the player object set based on the input from the first input section, change, based on the input from the second input section, the set direction relating to the action of the player object; and display, on a first display area, images taken by a first virtual camera in the virtual space and display, on a second display area different from the first display area, images taken by a second virtual camera in the virtual space, wherein an image of the images taken by the first virtual camera and an image of the images taken by the second virtual camera are simultaneously displayed, the first virtual camera the second virtual camera are present in the same virtual space and take the images from different positions in the virtual space an imaging direction of the first virtual camera is set based on the movement direction of the player object, an imaging direction of the second virtual camera is set based on the direction relating to the action of the player object, and while maintaining the imaging direction of the first virtual camera set based on the movement direction of the player object, change the set imaging direction of the second virtual camera based on the changed direction relating to the action of the player object.

2. The information processing apparatus according to claim 1, wherein the direction of movement of the player object the direction relating to the action of the player object other than the movement set based on the first input section are the same, the direction relating to an action of the player object changed based on the input from the second input section is different from the direction of movement of the player object.

3. The information processing apparatus according to claim 1, wherein the direction relating to the action of the player object other than the movement is a direction in which the player object performs an attack in predetermined game processing.

4. The information processing apparatus according to claim 1, wherein the direction relating to the action of the player object other than the movement is a direction of a shooting aim used for a shooting process in predetermined game processing.

5. The information processing apparatus according to claim 1, wherein the first display area is included in a first display device, the second display area is included in a second display device different from the first display device.

6. The information processing apparatus according to claim 1, wherein the second display area is a display section included in the same housing as the input device.

7. The information processing apparatus according to claim 1, wherein the second input section is a motion sensor configured to detect a motion of the input device itself.

8. The information processing apparatus according to claim 7, wherein the motion sensor is an angular velocity sensor.

9. The information processing apparatus according to claim 1, wherein the first input section is an input section using no motion sensor.

10. The information processing apparatus according to claim 9, wherein the input section using no motion sensor is an input unit capable of outputting an input amount from a reference position to a predetermined direction.

11. The information processing apparatus according to claim 1, wherein the one or more processors are configured to take, with the first virtual camera, images to be displayed on the first display area so that the images becomes images based on a third-person viewpoint, and take, with the second virtual camera, images to be displayed on the second display area so that the images becomes images based on a first-person viewpoint.

12. The information processing apparatus according to claim 11, wherein the one or more processors are configured to, in the image taking with the first virtual camera, take the images so that the player object is always included in an image taking range.

13. The information processing apparatus according to claim 1, wherein the one or more processors are configured to, based on the input from the second input section, set a direction of movement of a predetermined object relating to the action of the player object other than the movement of the player object.

14. The information processing apparatus according to claim 1, wherein the one or more processors are configured to:

designate a predetermined position in a virtual space, based on the input from the second input section, and based on the designated position, change the set direction relating to the action of the player object other than the movement.

15. The information processing apparatus according to claim 1, wherein the one or more processors are further configured to:

switch an operation to control movement of the player object based on the input from the first input section, to an automatic operation to automatically control movement of the player object, and while the automatic operation is being executed, display, on the first display area, an image taken with the first virtual camera based on the direction of movement of the player object controlled by the automatic operation.

16. The information processing apparatus according to claim 1, wherein the first and second virtual cameras take images at the same time, the imaging direction of first virtual camera in the virtual space corresponds to movement direction of the player object at the time the image is taken by the first virtual camera, the imaging direction of second virtual camera in the virtual space corresponds to direction relating to the action of the player object other than the movement at the time the image is taken by the second virtual camera.

17. The information processing apparatus according to claim 1, wherein the direction and position of the first virtual camera in the virtual space is different from the direction and position of the second virtual camera in the virtual space, and the direction of the second virtual camera is changed independent of the direction of the first virtual camera.

18. The information processing apparatus according to claim 1, wherein the first display area the second display area are separately housed, and the second display area is commonly housed with the input device.

19. The information processing apparatus according to claim 1, wherein the direction of the first virtual camera is set to the direction of movement of the player object, and the direction of the second virtual camera is set to the direction of movement of the player object and is changed when the direction relating to the action of the player object is changed, based on the second input, to a predetermined direction.

20. The information processing apparatus according to claim 1, wherein the position of the first virtual camera and the position of the second virtual camera are changed with movement of the player object in the movement direction of the player object set based on the input from the first input section, and the positional relationship between first virtual camera the second virtual camera is maintained during movement of the player object.

21. The information processing apparatus according to claim 1, wherein the direction relating to the action of the player object is a direction of a shooting aim used for a shooting process, and the imaging direction of the second virtual camera corresponds to the shooting aim.

22. The information processing apparatus according to claim 1, wherein the direction relating to an action of the player object, changed based on the input from the second input section, is limited to a range of a hemisphere in front of the player object.

23. The information processing apparatus according to claim 1, wherein the position of the second virtual camera is in a field of view of the first virtual camera.

24. A computer-readable non-transitory storage medium having stored therein an information processing program executed by a computer of an information processing apparatus which controls a player object present in a virtual space by using an input device including a first input section and a second input section different from the first input section, the information processing program, when executed, causes the computer to:
  receive inputs from the first input section the second input section;
  set, based on the input from the first input section, a direction of movement of the player object and a direction relating to an action of the player object other than the movement;
  while maintaining the direction of movement of the player object set based on the input from the first input section, change, based on the input from the second input section, the set direction relating to the action of the player object; and
  display, on a first display area, images taken by a first virtual camera in the virtual space, and display, on a second display area different from the first display area, images taken by a second virtual camera in the virtual space, wherein
  an image of the images taken by the first virtual camera an image of the images taken by the second virtual camera are simultaneously displayed, the first virtual camera the second virtual camera are present in the same virtual space and take the images from different positions in the virtual space, an imaging direction of the first virtual camera is set based on the movement direction of the player object, an imaging direction of the second virtual camera is set based on the direction relating to the action of the player object, and while maintaining the imaging direction of the first virtual camera set based on the movement direction of the player object, change the set imaging direction of the second virtual camera based on the changed direction relating to the action of the player object.

25. The computer-readable non-transitory storage medium of claim 24, wherein the first and second virtual cameras take images at the same time, the imaging direction of first virtual camera in the virtual space corresponds to movement direction of the player object at the time the image is taken by the first virtual camera, the imaging direction of second virtual camera in the virtual space corresponds to direction relating to the action of the player object other than the movement at the time the image is taken by the second virtual camera.

26. The computer-readable non-transitory storage medium of claim 24, wherein the direction and position of the first virtual camera in the virtual space is different from the direction and position of the second virtual camera in the virtual space, the direction of the second virtual camera is changed independent of the direction of the first virtual camera.

27. An information processing method for controlling a computer of an information processing apparatus which controls a player object present in a virtual space by using an input device including a first input section and a second input section different from the first input section, the information processing method comprising the steps of:
  receiving inputs from the first input section and the second input section;
  setting, based on the input from the first input section, a direction of movement of the player object and a direction relating to an action of the player object other than the movement;
  while maintaining the direction of movement of the player object set based on the input from the first input section, changing, based on the input from the second input section, the set direction relating to the action of the player object; and
  displaying, on a first display area, images taken by a first virtual camera in the virtual space, and displaying, on a second display area different from the first display area, images taken by a second virtual camera in the virtual space, wherein
  an image of the images taken by the first virtual camera and an image of the images taken by the second virtual camera are simultaneously displayed, the first virtual camera the second virtual camera are present in the same virtual space and take the images from different positions in the virtual space, an imaging direction of the first virtual camera is set based on the movement direction of the player object, an imaging direction of the second virtual camera is set based on the direction relating to the action of the player object, and while maintaining the imaging direction of the first virtual camera set based on the movement direction of the player object, change the set imaging direction of the second virtual camera based on the changed direction relating to the action of the player object.

28. The information processing method of claim 27, wherein the first and second virtual cameras take images at the same time, the imaging direction of first virtual camera in the virtual space corresponds to movement direction of the player object at the time the image is taken by the first virtual camera, and the imaging direction of second virtual camera in the virtual space corresponds to direction relating to the action of the player object other than the movement at the time the image is taken by the second virtual camera.

29. The information processing method of claim 27, wherein the direction and position of the first virtual camera in the virtual space is different from the direction and position of the second virtual camera in the virtual space, the direction of the second virtual camera is changed independent of the direction of the first virtual camera.

30. An information processing system comprising:
  an input device including a first input section and a second input section different from the first input section; and
  one or more processors operably coupled to the input device and configured to:
    control a player object present in a virtual space;

receive inputs from the first input section the second input section;

set, based on the input from the first input section, a direction of movement of the player object and a direction relating to an action of the player object other than the movement;

while maintaining the direction of movement of the player object set based on the input from the first input section, change, based on the input from the second input section, the set direction relating to the action of the player object; and display, on a first display area, images taken by a first virtual camera in the virtual space, and display, on a second display area different from the first display area, images taken by a second virtual camera in the virtual space, wherein an image of the images taken by the first virtual camera and an image of the images taken by the second virtual camera are simultaneously displayed, the first virtual camera and the second virtual camera are present in the same virtual space and take the images from different positions in the virtual space, an imaging direction of the first virtual camera is set based on the movement direction of the player object, an imaging direction of the second virtual camera is set based on the direction relating to the action of the player object, and while maintaining the imaging direction of the first virtual camera set based on the movement direction of the player object, change the set imaging direction of the second virtual camera based on the changed direction relating to the action of the player object.

31. The information processing system according to claim 30, wherein the first display area and the second display area are separately housed, and the second display area is commonly housed with the input device.

* * * * *